(12) United States Patent
Campbell et al.

(10) Patent No.: US 6,481,997 B1
(45) Date of Patent: Nov. 19, 2002

(54) MULTI-PART CANDLE WICK DIE PLATES

(75) Inventors: Bruce M. Campbell, Mattituck; Hershell P. Sablowski, Patchogue, both of NY (US)

(73) Assignee: Edwin B. Stimpson Company, Inc., Bayport, NY (US)

( * ) Notice: Subject to any disclaimer, the term of this patent is extended or adjusted under 35 U.S.C. 154(b) by 0 days.

(21) Appl. No.: 09/584,043

(22) Filed: May 30, 2000

(51) Int. Cl.$^7$ ............................................. B29C 43/000
(52) U.S. Cl. ................... 425/192 R; 425/392; 425/395; 425/803; 249/118; 249/168
(58) Field of Search ............................. 425/803, 192 R, 425/385, 388, 395, 392, 403; 249/168, 118

(56) References Cited

U.S. PATENT DOCUMENTS

| | | | | |
|---|---|---|---|---|
| 280,566 A | * | 7/1883 | Brelivet | 425/122 |
| 305,787 A | * | 9/1884 | Brelivet | 425/117 |
| 488,752 A | * | 12/1892 | Collum | 425/395 |
| 873,073 A | * | 12/1907 | Nordfors | 425/122 |
| 1,168,433 A | * | 1/1916 | Seiter | 249/83 |
| 1,630,922 A | * | 5/1927 | Burley | 425/86 |
| 1,899,907 A | * | 2/1933 | Young | 425/395 |
| 2,468,539 A | * | 4/1949 | Berger | 425/468 |
| 3,568,246 A | * | 3/1971 | David | 425/4 R |
| 3,907,245 A | * | 9/1975 | Linder | 294/94 |
| 4,188,009 A | * | 2/1980 | Gillespie | 249/78 |
| 4,537,570 A | * | 8/1985 | Black et al. | 425/450.1 |
| 5,795,596 A | * | 8/1998 | Stanton et al. | 425/116 |

* cited by examiner

Primary Examiner—Nam Nguyen
Assistant Examiner—Joseph S Del Sole
(74) Attorney, Agent, or Firm—Galgano & Burke

(57) ABSTRACT

A candle wick die plate includes an aluminum subframe with a split stainless steel die station. The die station has a lower member and a plurality of removable upper members. The die holes are aligned with their diameters collinear with the division between the upper members and the lower member. According to the presently preferred embodiment, each upper member is associated with a single die hole, half of which is defined by the upper member and the other half of which is defined by the lower member. Each upper member is preferably provided with an insulated handle and the lower member is preferably provided with a plurality of clamps for clamping the upper members in position. The upper and lower members are preferably provided with mating pins and holes for rapid alignment.

7 Claims, 3 Drawing Sheets

MULTI-PART CANDLE WICK DIE PLATES

This application is related to co-pending applications Ser. No. 09/584,041, entitled "Method and Apparatus for Impregnating a Candle Wick with Candle Wax", Ser. No. 09/584,042 entitled Self-Centering Crimping Tool for Securing an Eyelet to a Candle Wick", and Ser. No. 09/584,044 now U.S. Pat. No. 6,341,409 entitled "Clip disk Assembly for Carrying Candle Wick Eyelets", all filed simultaneously herewith, the complete disclosures of which are hereby incorporated by reference herein.

BACKGROUND OF THE INVENTION

1. Field of the Invention

The invention relates to the manufacture of candles. More particularly, the invention relates to the manufacturing of a wax impregnated candle wick. Most particularly, the invention relates to dies used in the manufacture of a wax impregnated candle wick.

2. State of the Art

It is well known in the art of candle making to pass a wick material through a bath of molten candle wax to impregnate the wick with wax. In the mass production of candles, a continuous string of wick material (cotton, paper, or other material) is fed through a series of operations including bathing the wick in molten wax. The state of the art apparatus for bathing the wick material is usually a single idler pulley or grooved stud located below the surface of the molten wax bath. The wick material is guided by pulleys or grooved studs to the bath whereupon it is fed through the bath by travelling under the single idler pulley or grooved stud which is located beneath the surface of the molten wax. Upon exiting the bath, the wax impregnated wick is passed through one or more dies whereby excess wax is trimmed and the final diameter of the wick is determined Prior art FIGS. 1 and 2 illustrate a state of the art die 10 for trimming wax impregnated candle wicks. The die is an aluminum plate approximately 0.5 inches by approximately 18.0 inches by approximately 5.0 inches. The plate has left and right notches 12, 14 and mounting holes 16, 18 between which there are located a plurality of tapered die holes 20a–20i, typically of different sizes. The state of the art die has several disadvantages. Most notably, it is difficult to thread the wick through the holes in the die. This is particularly so when the wick is impregnated with hot molten wax. During wick production, it is not uncommon for the continuous wick string to break whereafter, the die must be rethreaded, a time consuming and dangerous operation as the die is heated to keep the wax soft as the wick passes through it. In addition, the aluminum die plates need frequent replacement in order to maintain consistency in wick diameter. The aluminum is soft enough to wear over time, enlarging the holes so that the wicks manufactured with the die have too large diameters. Wicks with too large diameters will bind or jam the wick making machine or will not fit through the eyelets designed to hold them.

SUMMARY OF THE INVENTION

It is therefore an object of the invention to provide an improved candle wick die plate.

It is also an object of the invention to provide an improved candle wick die plate which avoids the disadvantages of the prior art.

It is another object of the invention to provide an improved candle wick die plate which is easy to thread.

It is still another object of the invention to provide an improved candle wick die plate which can be threaded without exposing the worker's hands to the hot die surface.

It is yet another object of the invention to provide an improved candle wick die plate which is easy to thread when a wick string breaks during production.

It is still another object of the invention to provide an improved candle wick die plate which is suitable for an assembly line manufacturing process.

In accord with these objects which will be discussed in detail below, the die plate according to the invention includes an aluminum subframe with a split stainless steel die station. The die station has a lower member and a plurality of removable upper members. The die holes are aligned with their diameters collinear with the division between the upper members and the lower member. According to the presently preferred embodiment, each upper member is associated with a single die hole, half of which is defined by the upper member and the other half of which is defined by the lower member. Each upper member is preferably provided with an insulated handle and the lower member is preferably provided with a plurality of clamps for clamping the upper members in position. The upper and lower members are preferably provided with mating pins and holes for rapid alignment. The die plate according to the invention is easily threaded by unclamping an upper member from the lower member, removing it, laying wick material in the lower half of the die hole defined by the lower member, and then replacing the upper member. The stainless steel material used for the die plate is highly wear resistant and the wicks produced with it have a consistent diameter. In addition to saving considerable time during normal threading operations, the split die plates of the invention provide other unexpected advantages. For example, if a wick string breaks upstream from the die, it can be repaired with a knot and the upper member of the die can be lifted momentarily to allow the knot to pass.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
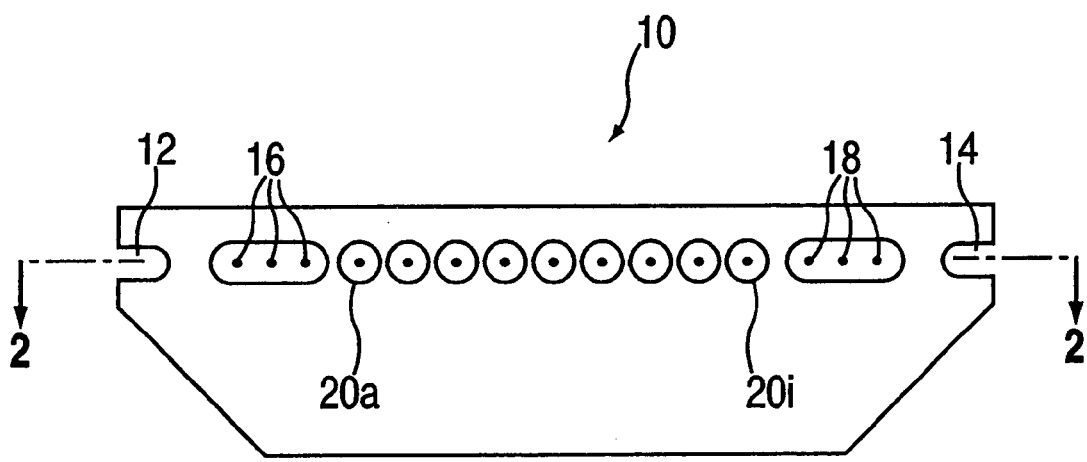
FIG. 1 is a side elevational view of a prior art wick die plate.
Figure 2:
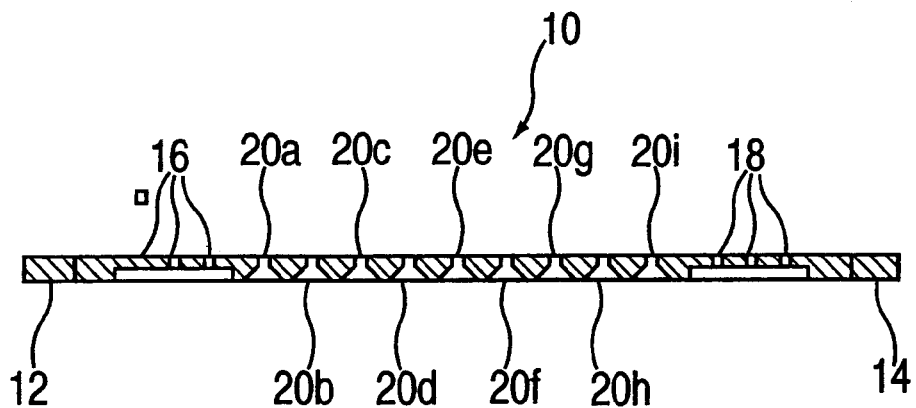
FIG. 2 is a section taken along line 2—2 in FIG. 1.
Figure 3:
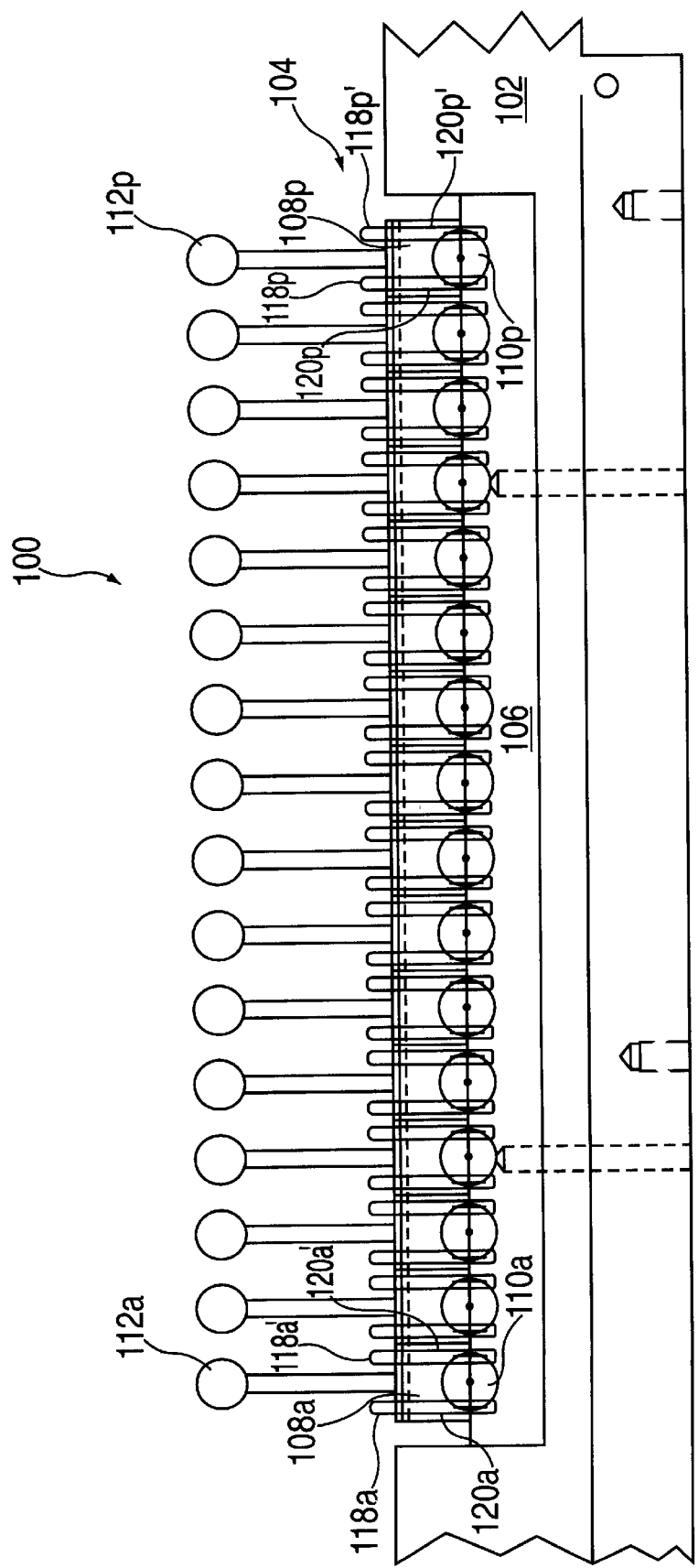
FIG. 3 is a broken, partially transparent view of a split die plate according tot he invention.
Figure 4:
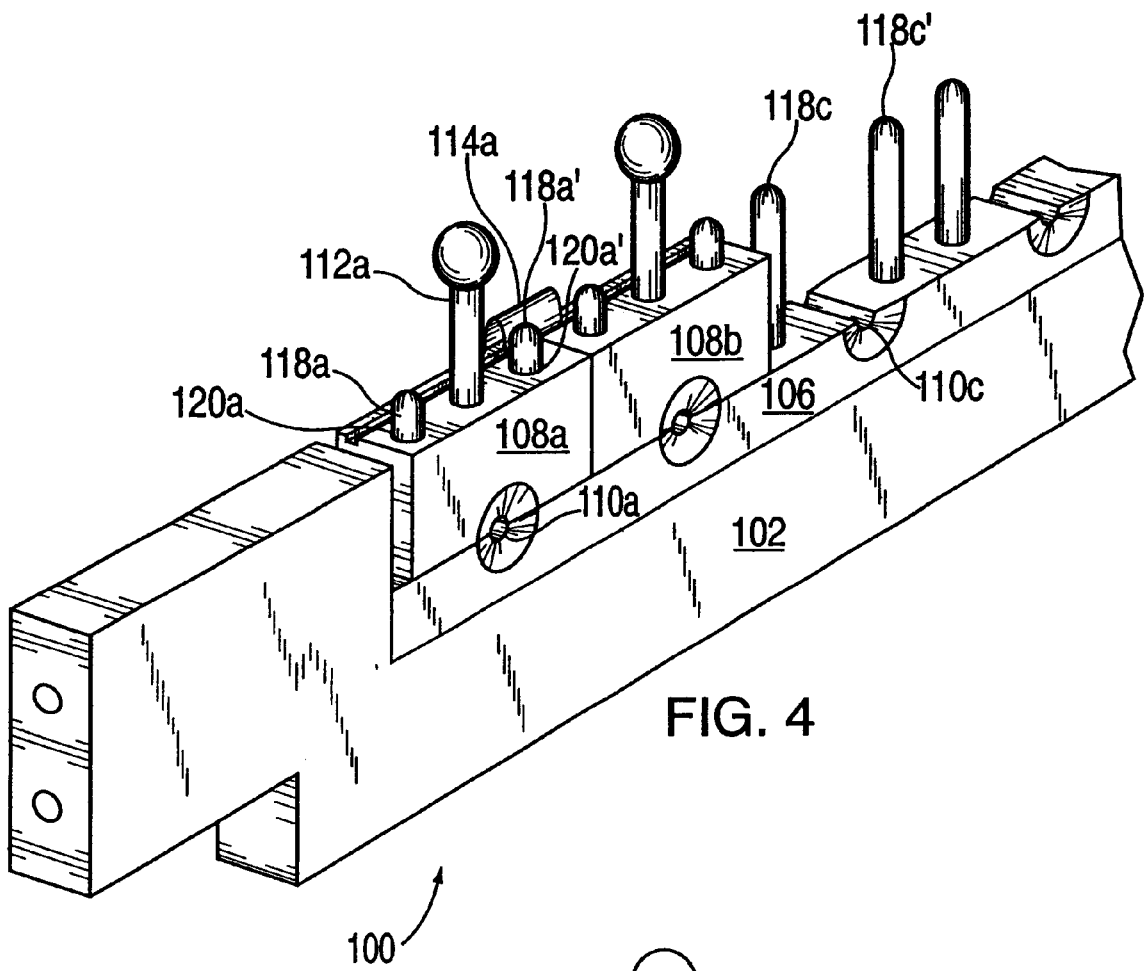
FIG. 4 is a broken perspective view of a die plate according to the invention.
Figure 5:
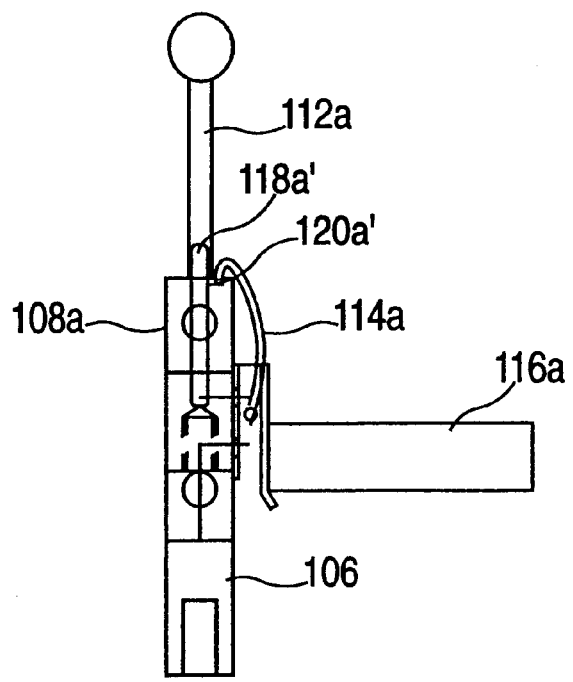
FIG. 5 is a side elevational view orthogonal to FIG. 3.

Referring now to FIGS. 3 through 5, a die plate 100 according to the invention includes an aluminum subframe 102 with a split stainless steel die station 104. The die station 104 has a lower member 106 and a plurality of removable upper members 108a–108p. The die holes 110a–110p are aligned with their diameters collinear with the parting line between the upper members 108a–108p and the lower member 106. According to the presently preferred embodiment, each upper member 108a–108p is associated with a single die hole 110a–110p, half of which is defined by the upper member and the other half of which is defined by the lower member. Each upper member is preferably provided with an insulated handle 112a–112p and the lower member is preferably provided with a plurality of clamps, e.g. 114a seen in FIGS. 4 and 5, for clamping the upper members in position. The clamps are each provided with an insulated release handle 116a.

The upper and lower members are preferably provided with mating pins and holes for rapid alignment. As illustrated, the lower member 106 has a pair of upstanding pins, 118a, 118a' through 118p, 118p', for each upper member. Each upper member has a corresponding pair of holes 120a, 120a' through 120p, 120p'.

The die plate 100 according to the invention is easily threaded by unclamping an upper member 108 from the lower member 106, removing the upper member, laying wick material in the lower half of the die hole defined by the lower member (see e.g. 110C in FIG. 4), and then replacing the upper member 108. The stainless steel material used for the die plate 106, 108 is highly wear resistant and the wicks produced with it have a consistent diameter. In addition to saving considerable time during normal threading operations, the split die plates of the invention provide other unexpected advantages. For example, if a wick string breaks upstream from the die, it can be repaired with a knot and the upper member of the die can be lifted momentarily to allow the knot to pass.

There has been described and illustrated herein a multi-part candle wick die plate. While particular embodiments of the invention have been described, it is not intended that the invention be limited thereto, as it is intended that the invention be as broad in scope as the art will allow and that the specification be read likewise. It will therefore be appreciated by those skilled in the art that yet other modifications could be made to the provided invention without deviating from its spirit and scope as so claimed.

What is claimed is:

1. A candle wick die plate, comprising:

a) lower member defining a plurality of lower approximately 180° of die holes;

b) a plurality of upper members each defining an upper approximately 180° of a die hole; and c) means for releasably attaching said upper members to said lower member whereby when attached, said upper and lower members define a plurality of complete die holes.

2. A candle wick die plate according to claim 1, further comprising:

d) a plurality of handles, each coupled to a respective upper member.

3. A candle wick die plate according to claim 1, wherein: said complete die holes are tapered.

4. A candle wick die plate according to claim 1, wherein: said upper members and said lower member are stainless steel.

5. A candle wick die plate according to claim 4, further comprising:

d) an aluminum subframe supporting said lower member.

6. A candle wick die plate according to claim 1, wherein: said means for releasably attaching includes a plurality of releasable clamps.

7. A candle wick die plate according to claim 1, wherein:

one of each said upper member and said lower member has a pair of mating pins, and the other of each said upper member and said lower member defines a pair of mating holes for receiving said pins.

* * * * *